(12) United States Patent
Guo et al.

(10) Patent No.: US 8,046,507 B2
(45) Date of Patent: Oct. 25, 2011

(54) COMPUTER, EXTERNAL STORAGE AND METHOD FOR PROCESSING DATA INFORMATION IN EXTERNAL STORAGE

(75) Inventors: Xiaobing Guo, Beijing (CN); Juejia Zhou, Beijing (CN)

(73) Assignees: Lenovo (Beijing) Limited (CN); Beijing Lenovo Software Ltd. (CN)

( * ) Notice: Subject to any disclaimer, the term of this patent is extended or adjusted under 35 U.S.C. 154(b) by 176 days.

(21) Appl. No.: 12/313,092

(22) Filed: Nov. 17, 2008

(65) Prior Publication Data
US 2009/0138633 A1 May 28, 2009

(30) Foreign Application Priority Data
Nov. 23, 2007 (CN) .......................... 2007 1 0178037

(51) Int. Cl.
*G06F 3/00* (2006.01)
(52) U.S. Cl. ................. 710/52; 710/5; 710/74
(58) Field of Classification Search .......... None
See application file for complete search history.

(56) References Cited

U.S. PATENT DOCUMENTS

| 7,177,530 B1* | 2/2007 | Suzuka | 386/124 |
| 2001/0016925 A1* | 8/2001 | Bucher et al. | 714/39 |
| 2005/0289262 A1* | 12/2005 | Sutardja | 710/74 |

FOREIGN PATENT DOCUMENTS
CN 1118474 A 3/1996

OTHER PUBLICATIONS

Hitachi Corporation, Directory Connected Disk Drive Unit, Nov. 20, 2006, IBM Technical Disclosure Bulletin, pp. 1-7.*

* cited by examiner

*Primary Examiner* — Eron J Sorrell
(74) *Attorney, Agent, or Firm* — Schwegman, Lundberg & Woessner, P.A.

(57) ABSTRACT

The present invention provides a computer, comprising: a processor for processing data; a system bus connected to the processor; a management unit connected to the system bus; and an external storage connected to the system bus through the management unit, wherein the external storage comprises: a buffer for buffering data; and storage areas connected to the buffer for storing data, and wherein the management unit is adapted to: receive an instruction sent by the processor from the system bus, said instruction corresponding to operations; read data information from the storage areas to the buffer; and execute at least one of the operations on the data information. Furthermore, the present invention provides an external storage and a method for processing data information in an external storage. According to the present invention, it is possible to scan the external storage with a large capacity in a short time.

9 Claims, 3 Drawing Sheets

COMPUTER, EXTERNAL STORAGE AND METHOD FOR PROCESSING DATA INFORMATION IN EXTERNAL STORAGE

RELATED APPLICATIONS

This application claims the benefit of priority, under 35 U.S.C. Section 119, to Chinese Patent Application Serial No. 200710178037.3, filed on Nov. 23, 2007, which is incorporated herein by reference in its entirety.

BACKGROUND OF THE INVENTION

1. Field of Invention

The present invention relates to the computer architecture, specifically, relates to a computer, an external storage and a method for processing data information in an external storage.

2. Description of Prior Art

Since the von Neumann architecture of modern computers was proposed by Doctor von Neumann, such kind of computer architecture has not been substantially changed, though the manufacture technology of Integrated Circuits has been dramatically improved.

FIG. 1 shows a computer architecture according to the prior art, comprising an operator 10, a controller 20, an internal storage 30, an input device 40, an output device 50, and an external storage 60, as well as an address bus 72, a control bus 74 and a data bus 76.

The internal storage 30 is generally implemented as RAM (Random Access Memory). Furthermore, as the manufacture technology of ICs improves, various RAMs are available for memories, such as DRAM (Dynamic Random Access Memory), SDRAM (Synchronous Dynamic Random Access Memory), DDR SDRAM (Double Data Rate Synchronous Dynamic Random Access Memory) and the like.

The external storage 60 is generally implemented as HD (Hard Drive). In order to satisfy some specific requirements, the external storage 60 may also comprise an electronic disk made of chips such as EPROM (Erasable Programmable Read Only Memory) or an optical disk.

Generally, the operator 10 and the controller 20 are integrated in a CPU (Central Processing Unit). The address bus 72, the control bus 74 and the data bus 76 together constitute computer buses, generally located on a computer main board.

The CPU, the internal storage 30, the external storage 60 and the computer buses together constitute the host computer.

The input device 40 comprises devices such as keyboard, mouse, scanner and the like. The output device 50 comprises devices such as displayer, printer, speaker and the like. The input device 40 and the output device 50 together are called as peripheral devices. They are connected to the computer buses via IO (Input Output) interfaces. Common IO interfaces comprise serial ports, parallel ports, USB (Universal Serial Bus) interfaces and the like.

In the above described computer architecture, the external storage 60 usually is a storage medium which has a large capacity and a low cost, and will permanently store data, but has a slow accessing speed, such as a magnetic medium; and the internal storage 30 usually is a storage medium which has a high accessing speed but a small capacity and an expensive cost, and will lose data when being powered off, such as a RAM chip. Therefore, the external storage 60 is often used as a storage medium, while the internal storage 30 is used as a work space. When the CPU executes a specific computer program, first it reads the data and program from the storage medium, the external storage 60, to the work space, the internal storage 30, and then carries out operating in the work space.

However, when it is necessary to execute a scan task with respect to specific data in the external storage 60 with a large capacity, the scan task will take a long time due to the large capacity and the slow accessing speed of the external storage 60.

For example, current anti-virus software installed on many business computers periodically scan viruses every week. Because each time it is necessary to perform scanning/searching in the whole disk, and processes are possible only after the contents in the HD are read to the internal storage via the computer buses, it is very time consuming. Likewise, when searching for a file with specific content, it is needed to read the contents of all files in the whole disk to the internal storage one by one, and then carry out searching, so it is time consuming, too.

SUMMARY OF THE INVENTION

An object of the present invention is to provide a computer, an external storage and a method for processing data information in an external storage, by which the above problem of time consuming encountered when scanning the external storage can be solved.

According to an aspect of the present invention, a computer is provided, comprising: a processor for processing data; a system bus connected to the processor; a management unit connected to the system bus; and an external storage connected to the system bus through the management unit, wherein the external storage comprises: a buffer for buffering data; and storage areas connected to the buffer for storing data, and wherein the management unit is adapted to receive an instruction sent by the processor from the system bus, the instruction corresponding to operations; read data information from the storage areas to the buffer; and execute at least one of the operations on the data information.

In above described embodiment, the transmission time by the system bus is saved and the burden on the processor is reduced through incorporating the intelligent processing capability to the external storage, so that it is possible to scan the external storage with a large capacity in a short time.

According to another aspect of the present invention, an external storage is provided, which can exchange data with a data transmission line of a data processing system, comprising: a management unit connected to the data transmission line; a buffer connected to the management unit for buffering data; and storage areas connected to the buffer for storing data, wherein the management unit is adapted to receive an instruction, the instruction corresponding to operations; read data information from the storage areas to the buffer; and execute at least one of the operations on the data information.

In above described embodiment, the contents in the external storage are directly transmitted to the buffer of the external storage, and the search operation is directly executed by the management unit of the external storage. Thus, it is unnecessary to transmit the data stored in the storage areas to an internal storage of a computing device through the data transmission line, and it is unnecessary to execute the search operation by the computing device. Therefore, the transmission time by the data transmission line is saved and the burden on the computing device is reduced, so that it is possible to scan the external storage with a large capacity in a short time.

According to yet another aspect of the present invention, a method for processing data information in an external storage is provided, the external storage comprising a buffer for buffering data and storage areas connected to the buffer for storing data, the method comprising steps of: receiving an instruction, the instruction corresponding to operations; reading the data information from at least one of the storage areas to the buffer; and executing at least one of the operations on the data information.

In above described method, it is unnecessary to transmit the data stored in the storage areas to an internal storage through a system bus, and it is unnecessary to execute the search operation by a CPU. Therefore, the transmission time by the system bus is saved and the burden on the CPU is reduced, so that it is possible to scan the external storage with a large capacity in a short time.

BRIEF DESCRIPTION OF THE DRAWINGS

Further understandings on the present invention may be obtained from the drawings, which constitute a part of the present application. Schematic embodiments of the present invention and the description thereof are provided for illustrating the present invention, but are not intended to limit the present invention.

In the drawings.

DETAILED DESCRIPTION OF PREFERRED EMBODIMENTS

Figure 1:
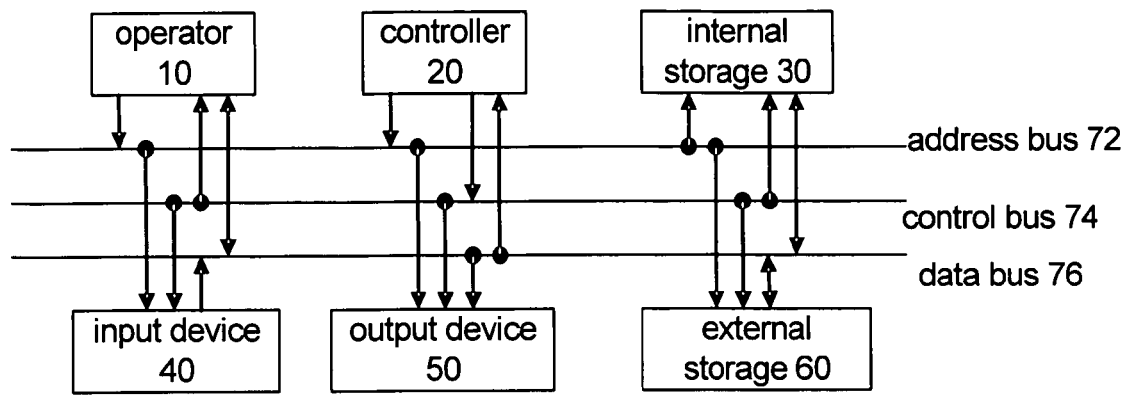
FIG. 1 shows a computer architecture according to the prior art.

Now, the present invention will be described in detail by referring to the drawings in connection with the embodiments.

Figure 2:
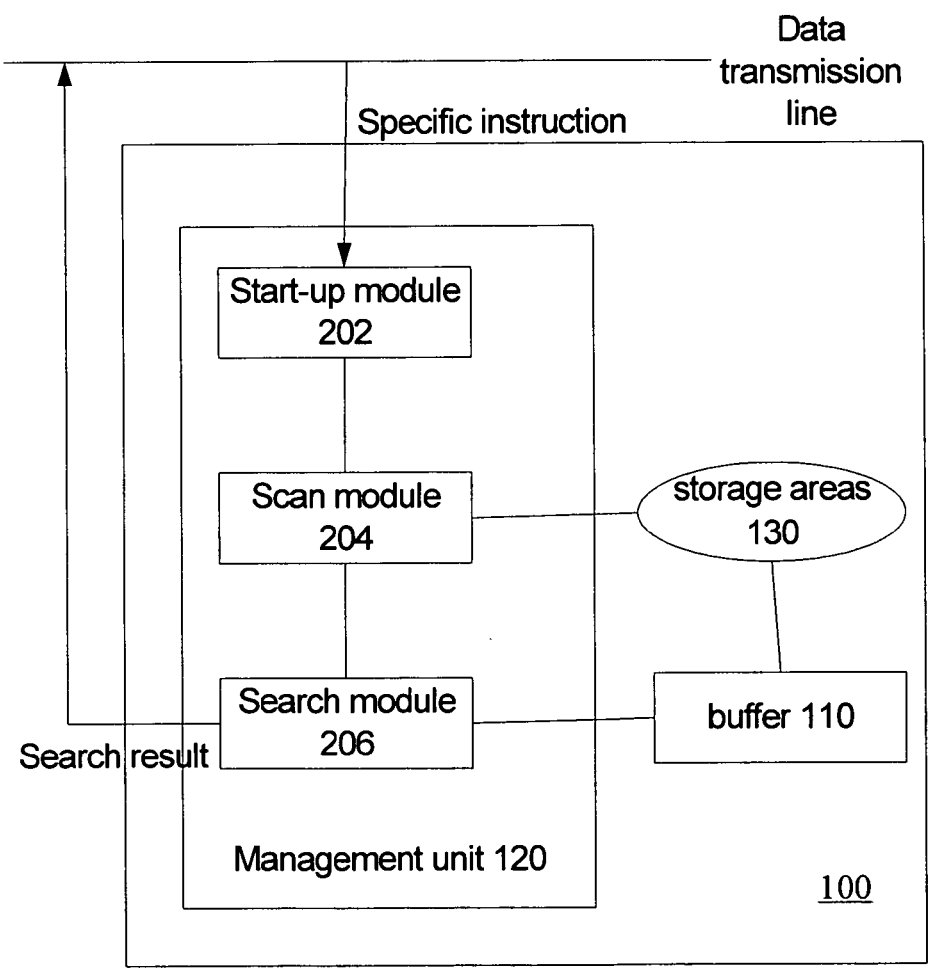
FIG. 2 is a block diagram showing an external storage according to an embodiment of the present invention.

FIG. 2 is a block diagram showing an external storage 100 according to an embodiment of the present invention. This external storage, which can exchange data with a data transmission line of a data processing system, comprises: a management unit 120 connected to the data transmission line; a buffer 110 connected to the management unit for buffering data; and storage areas 130 connected to the buffer for storing data. The management unit 120 is adapted to receiving an instruction from a system bus, the instruction corresponding to operations; read data information from the storage areas to the buffer; and execute at least one of the operations on the data information.

In the above described embodiment, the contents in the external storage are directly transmitted to the buffer of the external storage, and the search operation is directly executed by the management unit of the external storage. Thus, it is unnecessary to transmit the data stored in the storage areas to an internal storage of a computing device through the data transmission line, and it is unnecessary to execute the search operation by the computing device. Therefore, the transmission time by the data transmission line is saved and the burden on the computing device is reduced, so that it is possible to scan the external storage with a large capacity in a short time.

In one embodiment, the management unit 120 may comprise:

a start-up module 202 for receiving the instruction, which includes keyword information and information on at least one storage area corresponding to the at least one operation;

a scan module 204 for reading the data information of the at least one storage area to the buffer, each of the at least one storage area being smaller in capacity than the buffer; and a search module 206 for searching the data information in the buffer for the data information matching the keyword information.

In the above described embodiment, the keyword may be a character string. When the searching is performed on files, the keyword may be information such as size range, generation time range, modification time range, file extension range of the files.

The reason why the size of each section is set to be smaller than that of the buffer 110 is that the buffer 110 usually is an expensive component and thus has a small capacity. The scanning of the storage areas of the external storage is completed by reading these storage areas section by section from the beginning to the end.

In the above described management unit, the management unit 120 may be an external storage interface of the external storage 100, and may be implemented by a firmware. Obviously, the management unit 120 may be implemented by a microprocessor cooperated with a specific ROM (Read Only Memory). It is to be appreciated by those skilled in the art that there may be other implementations for the management unit 120, which all fall into the spirit and the scope of the present invention.

The above described external storage 100 may be at least one of a hard drive, an electronic disk composed of storage chips and an optical disk. Obviously, the above described management unit 120 may be adopted in an external storage of other mediums, which all fall into the spirit and the scope of the present invention.

According to the type of the external storage 100, the storage areas may be distributed on different mediums, such as magnetic medium, storage chip, or optical disk.

Figure 3:
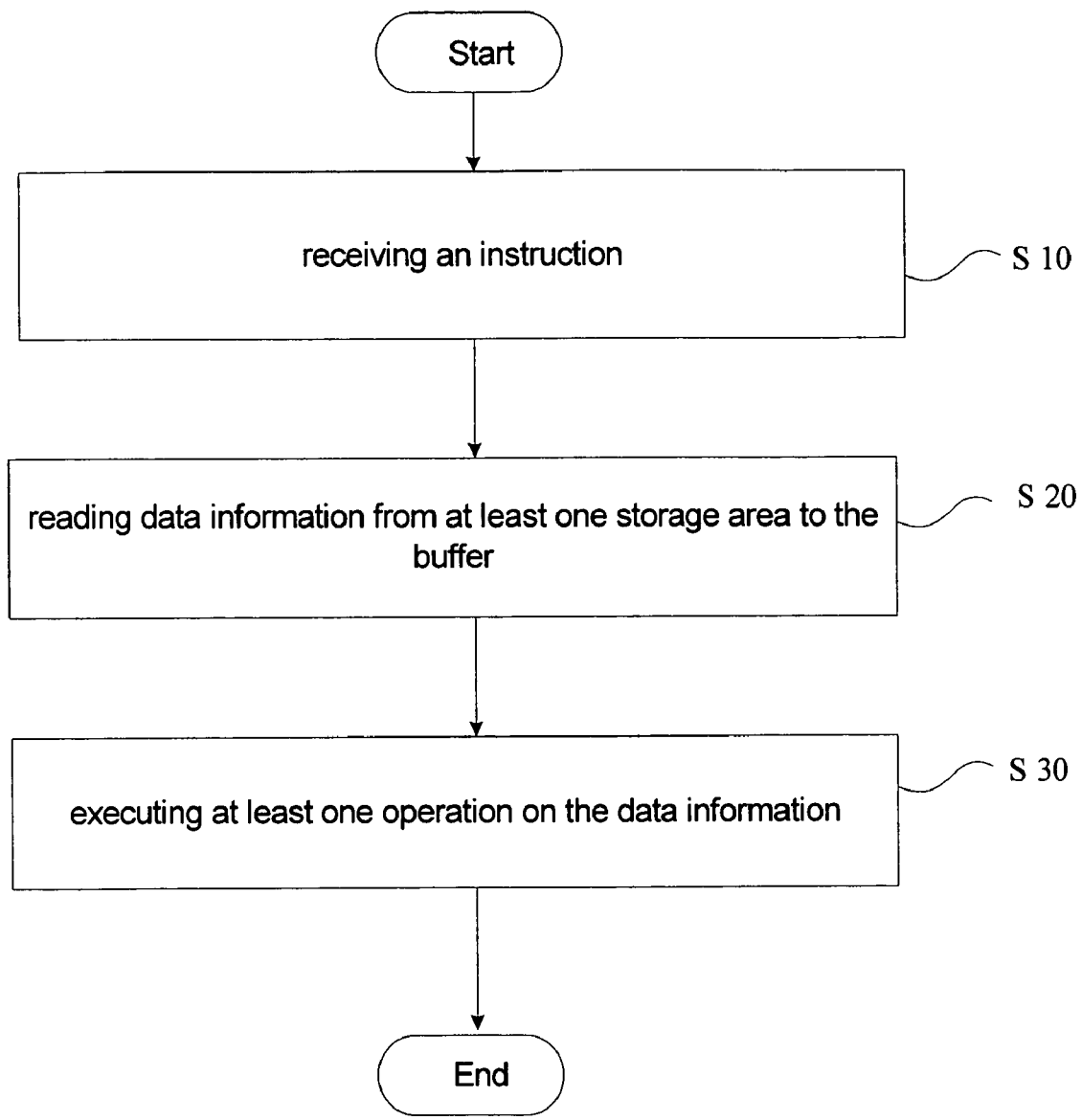
FIG. 3 is a flow chart showing a method for processing data information in an external storage according to an embodiment of the present invention.

FIG. 3 is a flow chart showing a method for processing data information in an external storage according to an embodiment of the present invention, the external storage comprising a buffer for buffering data and storage areas connected to the buffer for storing data, the method comprising steps of:

step S10, receiving an instruction, the instruction corresponding to operations;

step S20, reading the data information from at least one of the storage areas to the buffer; and step S30, executing at least one of the operations on the data information.

In the above described method, it is unnecessary to transmit the data stored in the storage areas to an internal storage through a system bus, and it is unnecessary to execute the search operation by a CPU. Therefore, the transmission time by the system bus is saved and the burden on the CPU is reduced, so that is it possible to scan the external storage with a large capacity in a short time.

In above embodiment, the instruction may comprise keyword information and information on the at least one storage area corresponding to the at least one operation.

Specifically, step S20 may comprise: reading the data information of the at least one storage area to the buffer, each of the at least one storage area being smaller in capacity than the buffer.

Specifically, step S30 may comprise: searching the data information in the buffer for the data information matching the keyword information.

In above described method of scanning the external storage, conditions under which the instruction is triggered comprise at least one of that: the number of clusters of the external storage to be scanned reaches a predetermined number; the number of blocks of the external storage to be scanned reaches a predetermined number; the number of cylinders of the external storage to be scanned reaches a predetermined number; the number of sectors of the external storage to be scanned reaches a predetermined number; a whole partition or a plurality of partitions of the external storage need to be scanned; the size of a single file or a plurality of files of the external storage to be scanned reaches a predetermined size; a whole volume or a plurality of volumes of the external storage need to be scanned; and the whole external storage or a plurality of such external storages need to be scanned.

Step S20 may comprise at least one of: reading the content of the storage area in unit of cluster; reading the content of the storage area in unit of block; reading the content of the storage area in unit of sector; and reading the content of the storage area in unit of cylinder.

In a specific implementation, for example, when it is required to scan viruses or search for specific file contents, the keyword may be divided into, e.g. two stages, wherein the first stage is realized by the management unit provided by the present command. Then the contents of the disk, which have passed the first stage scan, are scanned/matched by means of the second stage keyword by using the existing method (copying the contents of the disk to the internal storage).

In special cases, if the length of the keyword is long, making the keyword span a plurality of storage areas, a small piece of the end data of the last storage area may be remained according to the keyword length, and then be patched together with the beginning data of the current storage area, which are then searched. That is, step S20 specifically may comprise: performing reading section by section by taking one storage area as one section, if the content of the keyword is less than one storage area; and performing reading section by section by patching a plurality of storage areas which satisfy the keyword length as one section, if the content of the keyword is more than one storage area. Thus, the problem of too long keyword is solved.

Figure 4:
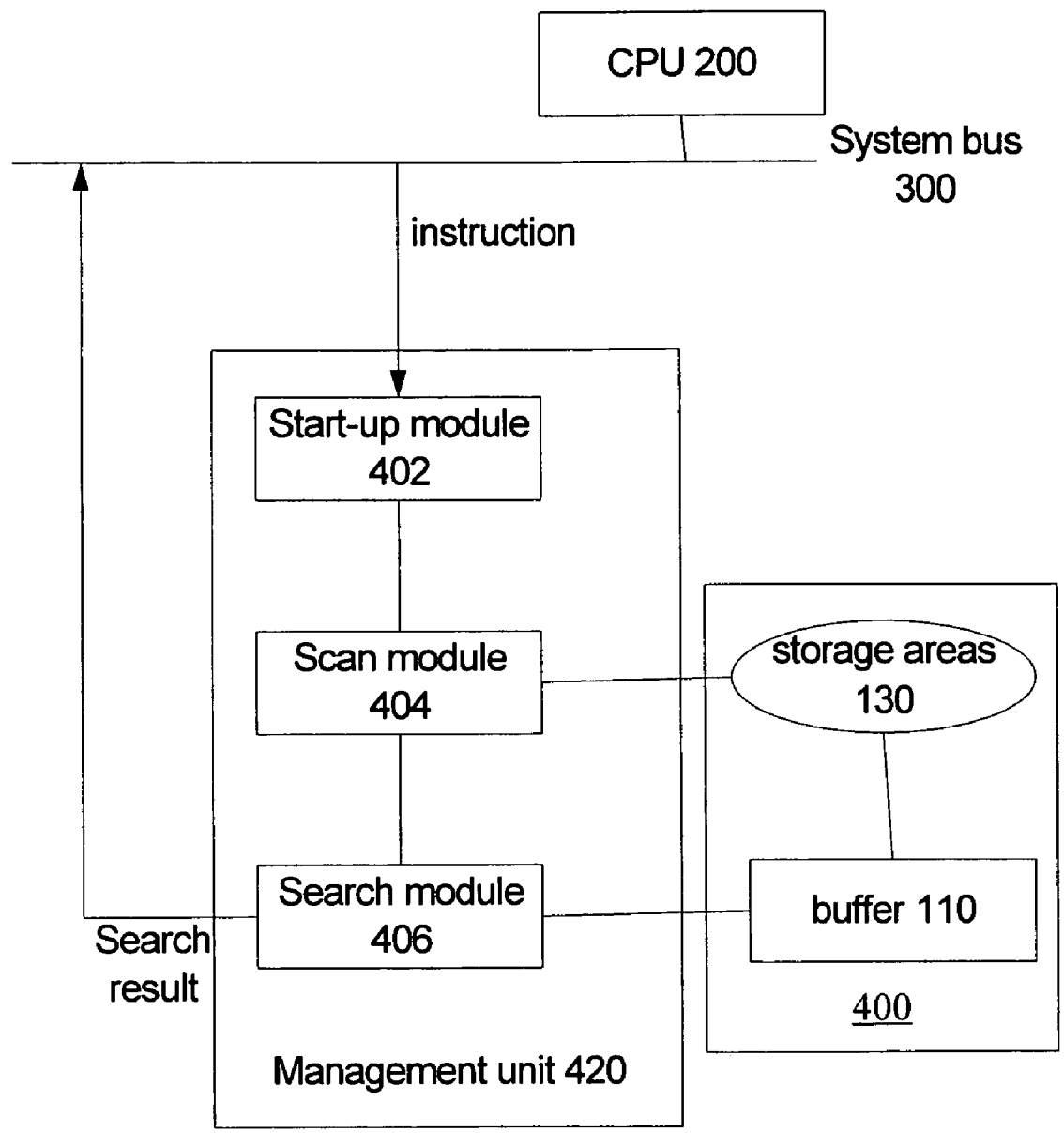
FIG. 4 shows a computer architecture according to an embodiment of the present invention.

FIG. 4 shows a computer architecture according to an embodiment of the present invention, comprising: a CPU 200 for processing data; a system bus 300 connected to the CPU 200; a management unit 420 connected to the system bus 300; an external storage 400 connected to the system bus 300 through the management unit 420. The external storage 400 comprises: a buffer 110 for buffering data; storage areas 130 connected to the buffer 110 for storing data. The management unit 420 is adapted to receive an instruction sent by the CPU 200 from the system bus 300, the instruction corresponding to operations; read data information from the storage areas 130 to the buffer 110; and execute at least one of the operations on the data information.

In the above described embodiment, the contents in the external storage are directly transmitted to the buffer of the external storage, and the search operation is directly executed by the management unit of the external storage. Thus, it is unnecessary to transmit the data stored in the storage areas to an internal storage through the system bus, and it is unnecessary to execute the search operation by the CPU. Therefore, the transmission time by the system bus is saved and the burden on the CPU is reduced, so that it is possible to scan the external storage with a large capacity in a short time.

In one embodiment, the management unit 420 may comprise:

a start-up module 402 for receiving the instruction, which includes keyword information and information on at least one storage area 130 corresponding to the at least one operation;

a scan module 404 for reading the data information of the at least one storage area 130 to the buffer 110, each of the at least one storage area 130 being smaller in capacity than the buffer 110; and a search module 406 for searching the data information in the buffer 110 for the data information matching the keyword information.

The scan module 404 may include a section fetch unit which is adapted to perform reading section by section by taking one storage area 130 as one section, if the content of the keyword is less than one storage area 130; and to perform reading section by section by patching a plurality of storage areas 130 which satisfy the keyword length as one section, if the content of the keyword is more than one storage area 130. The problem of too long keyword is solved by such section fetch unit.

Conditions under which the instruction is triggered may comprise at least one of that: the number of clusters of the external storage to be scanned reaches a predetermined number; the number of blocks of the external storage to be scanned reaches a predetermined number; the number of cylinders of the external storage to be scanned reaches a predetermined number; the number of sectors of the external storage to be scanned reaches a predetermined number; a whole partition or a plurality of partitions of the external storage need to be scanned; the size of a single file or a plurality of files of the external storage to be scanned reaches a predetermined size; a whole volume or a plurality of volumes of the external storage need to be scanned; and the whole external storage or a plurality of such external storages need to be scanned. The key point of the conditions triggering the instruction lies in that the storage area to be scanned is large enough so that it will achieve a remarkable effect by using the embodiment of the present invention. Obviously, it is to be understood by those skilled in the art that various trigger conditions may be set according to different data storage methods, which all fall into the spirit and the scope of the present invention.

This instruction is sent by the CPU 200 to the start-up module 402 of the management unit 420 through the system bus 300. The instruction may be written into the bottom layer of the operating system.

The scan module 404 may further comprise at least one of: a cluster scan unit for reading the contents of the storage areas 130 in unit of cluster; a block scan unit for reading the contents of the storage areas 130 in unit of block; a sector scan unit for reading the contents of the storage areas 130 in unit of sector; and a cylinder scan unit for reading the contents of the storage areas 130 in unit of cylinder. Obviously, it is to be understood by those skilled in the art that the scan module 404 may further comprise other scan units performing reading operation in other units according to different partitions of stored data in the storage area 130, which all fall into the spirit and the scope of the present invention.

From the above description, it can be seen that the present invention saves the transmission time by the system bus and reduces the burden on the CPU through incorporating the intelligent processing capability to the external storage, so that it is possible to scan the external storage with a large capacity in a short time.

Obviously, those skilled in the art should understand that the respective modules or steps described above may be realized by general computing devices, and may be integrated in a single computing device or be distributed across a network comprising a plurality of computing devices. Alternatively, they may be realized by program codes executable by a computing device and thus may be stored in a storage device to be executed by the computing device, or may be made as separate integrated circuits, or some of the plurality of the modules or steps may be made as a single integrated circuit. So, the present invention is not limited to any specific combination of hardware and software.

The above described are only preferred embodiments of the present invention, which are not intended to limit the present invention. For those skilled in the art, there may be various modifications and changes. Any changes, equivalents and modifications without departing from the spirit and principle of the present invention fall into the scope of the invention.

What is claimed is:

1. A computer, comprising:
   a processor for processing data;
   a system bus connected to the processor;
   a management unit connected to the system bus; and
   an external storage connected to the system bus through the management unit, wherein said external storage comprises:
      a buffer for buffering data; and
      storage areas connected to the buffer for storing data;
   and wherein said management unit comprises:
      a start-up module for receiving an instruction sent by the processor from the system bus, said instruction corresponding to an operation and comprising keyword information and information on at least one storage area corresponding to the operation;
      a scan module for reading the data information of the at least one storage area to the buffer, each of the at least one storage area being smaller in capacity than the buffer; and
      a search module for searching the data information in the buffer for the data information matching the keyword information.

2. The computer according to claim 1, wherein conditions under which the instruction is triggered comprise at least one of that:
   the number of clusters of the external storage to be scanned reaches a predetermined number;
   the number of blocks of the external storage to be scanned reaches a predetermined number;
   the number of cylinders of the external storage to be scanned reaches a predetermined number;
   the number of sectors of the external storage to be scanned reaches a predetermined number;
   a whole partition or a plurality of partitions of the external storage need to be scanned;
   the size of a single file or a plurality of files of the external storage to be scanned reaches a predetermined size;
   a whole volume or a plurality of volumes of the external storage need to be scanned; and
   the whole external storage or a plurality of such external storages need to be scanned.

3. The computer according to claim 1, wherein the scan module comprises at least one of:
   a cluster scan unit for reading contents of the storage areas in unit of cluster;
   a block scan unit for reading contents of the storage areas in unit of block;
   a sector scan unit for reading contents of the storage area in unit of sector; and
   a cylinder scan unit for reading contents of the storage area in unit of cylinder.

4. The computer according to claim 1, wherein management unit further comprises:
   a section fetch unit for performing reading section by section by taking one of the storage areas as one section, if the content of the keyword is less than one of the storage areas; and for performing reading section by section by patching a plurality of the storage areas which satisfy the length of the keyword as one section, if the content of the keyword is more than one of the storage areas.

5. An external storage, which can exchange data with a data transmission line of a data processing system, comprising:
   a management unit connected to the data transmission line;
   a buffer connected to the management unit for buffering data; and
   storage areas connected to the buffer for storing data;
   wherein said management unit comprises:
      a start-up module for receiving an instruction, said instruction corresponding to an operation and comprising keyword information and information on at least one storage area corresponding to the operation;
      a scan module for reading the data information of the at least one storage area to the buffer, each of the at least one storage area being smaller in capacity than the buffer; and
      a search module for searching the data information in the buffer for the data information matching the keyword information.

6. A method for processing data information in an external storage, the external storage comprising a buffer for buffering data and storage areas connected to the buffer for storing data, the method comprising steps of:
   receiving an instruction, said instruction corresponding to an operation and comprising keyword information and information on at least one storage area corresponding to the operation;
   reading the data information from the at least one storage area to the buffer; and
   searching the data information in the buffer for the data information matching the keyword information.

7. The method according to claim 6, wherein the step of reading the data information from the at least one storage area to the buffer comprises reading the data information of the at least one storage area to the buffer, each of the at least one storage area being smaller in capacity than the buffer.

8. The method according to claim 6, wherein conditions under which the instruction is triggered comprise at least one of that:
   the number of clusters of the external storage to be scanned reaches a predetermined number;
   the number of blocks of the external storage to be scanned reaches a predetermined number;
   the number of cylinders of the external storage to be scanned reaches a predetermined number;
   the number of sectors of the external storage to be scanned reaches a predetermined number;
   a whole partition or a plurality of partitions of the external storage need to be scanned;
   the size of a single file or a plurality of files of the external storage to be scanned reaches a predetermined size;
   a whole volume or a plurality of volumes of the external storage need to be scanned; and
   the whole external storage or a plurality of such external storages need to be scanned.

9. The method according to claim 6, wherein the reading comprises at least one of:
   performing reading in unit of cluster;
   performing reading in unit of block;
   performing reading in unit of sector; and
   performing reading in unit of cylinder.

* * * * *